United States Patent [19]

Shookman et al.

[11] Patent Number: 4,564,205
[45] Date of Patent: Jan. 14, 1986

[54] FLEXIBLE STEP ASSEMBLY

[75] Inventors: Dennis R. Shookman, Oreana; Vergil P. Hendrickson, Decatur, both of Ill.

[73] Assignee: Caterpillar Tractor Co., Peoria, Ill.

[21] Appl. No.: 638,445

[22] PCT Filed: Sep. 30, 1982

[86] PCT No.: PCT/US82/01365
§ 371 Date: Sep. 30, 1982
§ 102(e) Date: Sep. 30, 1982

[51] Int. Cl.$^4$ .............................................. B60R 3/02
[52] U.S. Cl. ................................ 280/166; 182/90; 182/196
[58] Field of Search ................ 280/166, 163; 182/86, 182/91, 89, 90, 196, 164; 59/78, 84

[56] References Cited

U.S. PATENT DOCUMENTS

| 628,824 | 7/1899 | Maier | 182/164 |
|---|---|---|---|
| 2,678,832 | 5/1954 | Wright | 182/89 |
| 3,603,429 | 9/1971 | Shepherd | 182/91 |
| 3,662,539 | 5/1972 | Florjancic | 59/84 |
| 3,854,752 | 12/1974 | Flint et al. | 280/166 |
| 3,967,695 | 7/1976 | Waddell | 182/86 |
| 4,053,172 | 10/1977 | McClure | 280/163 |
| 4,054,299 | 10/1977 | Urbaitis | 280/163 |

Primary Examiner—David M. Mitchell
Attorney, Agent, or Firm—William C. Perry

[57] ABSTRACT

In a flexible step assembly (10) for a construction vehicle (14) it is desirable to provide a step assembly (10) that is durable enough to withstand impact from uneven terrain and obstacles encountered in vehicle operation and that will also provide a stable platform from which to mount and dismount the vehicle. The flexible step assembly (10) of this invention is suspended from a vehicle (14) by very durable chain assemblies (34) which have a link construction (38,64) that will enable the chain assembly (34) to lock-up to resist movement in a lateral direction upon application of an operator's weight upon a suspended step member (82).

5 Claims, 3 Drawing Figures

FLEXIBLE STEP ASSEMBLY

DESCRIPTION

1. Technical Field

This invention relates to step assemblies and more particularly to flexible step assemblies that are used on heavy construction equipment that operate in very rugged terrain.

2. Background Art

Current heavy construction vehicles are often provided with step assemblies to facilitate the accessibility of the operator's station. Since vehicles of this type operate in very rough terrain, the necessary ground clearance usually requires the placement of a step below the main frame of the vehicle. While being at a convenient height for operator accessibility, the positioning usually subjects the step assembly to contact with uneven ground and/or other obstacles encountered in off-highway operation, which may result in severe damage that could render the step inoperative.

Conventional step configurations that have been developed to accommodate such physical abuse are typically shown in U.S. Pat. No. 4,054,299, which is fashioned from a length of flexible cable having a foot supporting member formed thereon that hangs in a loop from the vehicle frame. While the cable allows the step assembly to accommodate large impact forces as it is struck by various obstacles, it is usually so flexible that it is allowed to swing horizontally under the weight of an operator as he mounts the step assembly. In addition to being unstable, the swinging of the step can often cause the operator's shin to bang against the frame structure.

Other step arrangements such as those disclosed in U.S. Pat. Nos. 3,854,752 and 4,053,172 both of which are assigned to the assignee of this application, employ step assemblies that have very sturdy support brackets that are pivotally mounted to the vehicle. As an obstacle is encountered the pivoting action of the brackets and the overall bulk of the components prevents the step assembly from becoming damaged to the point of inoperativeness. In these types of step assemblies, however, the structure is quite complex and they tend to be rather costly.

Still other step designs, such as those disclosed in U.S. Pat. No. 3,967,695, which is assigned to the assignee of this application, and U.S. Pat. No. 3,603,429 disclose step assemblies that are flexible enough to withstand impact from obstacles and have some provision to resist horizontal swinging of the step under the weight of an operator. Both designs employ a deformable stiffener of resilient material such as rubber or similar elastomeric material to supply the necessary lateral rigidity to prevent the step from swinging. It is well known that the concentrated stresses inherent in this particular type of environment often result in premature failure of the resilient material.

The present invention is directed to overcoming one or more of the problems as set forth above.

DISCLOSURE OF THE INVENTION

In one aspect of the present invention a step assembly is disclosed that is extremely flexible so as to absorb any impact upon contact with an obstacle without damage while also being capable of becoming substantially rigid in a lateral direction when an operator places his weight upon the step as he mounts or dismounts the vehicle.

The step is suspended from the frame of the vehicle by a pair of chain assemblies. Each chain assembly is comprised of interlocking links. Each link is triangular in cross section and interacts with an angle formed by the overall shape of each link. This interaction between the similar angles allows the links to wedge together upon application of a downward force.

Thus, the chain construction of the present invention provides the necessary durability that previous "chain type" steps have exhibited in the past. Yet, the particular construction and relationship between the chain links of the present invention is such that it displays the ability to "lock-up" under the operator's weight to provide a stable platform from which he may enter and exit the operator's station. The flexible step arrangement as disclosed herein solves both problems previously set forth while retaining a very simple construction.

BEST MODE FOR CARRYING OUT THE INVENTION

Figure 1:
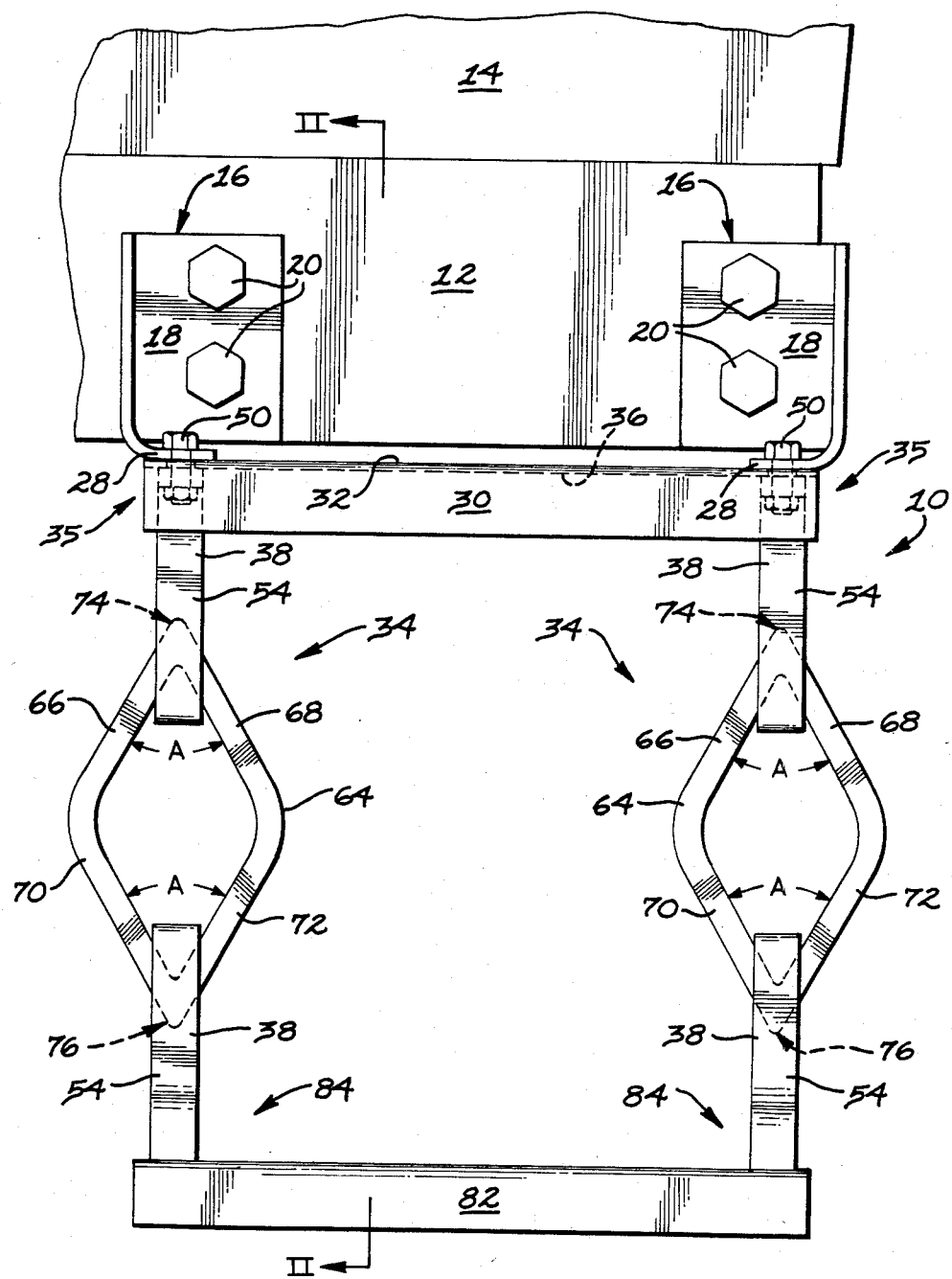
FIG. 1 is a fragmentary side view of a vehicle having a flexible step assembly of an embodiment of the present invention.

Referring to the drawings, a flexible step assembly 10, embodying the principles of the present invention is shown suspended from a portion of a frame 12 of a construction vehicle 14 such as a motor grader, tractor-scraper, or the like.

Figure 2:
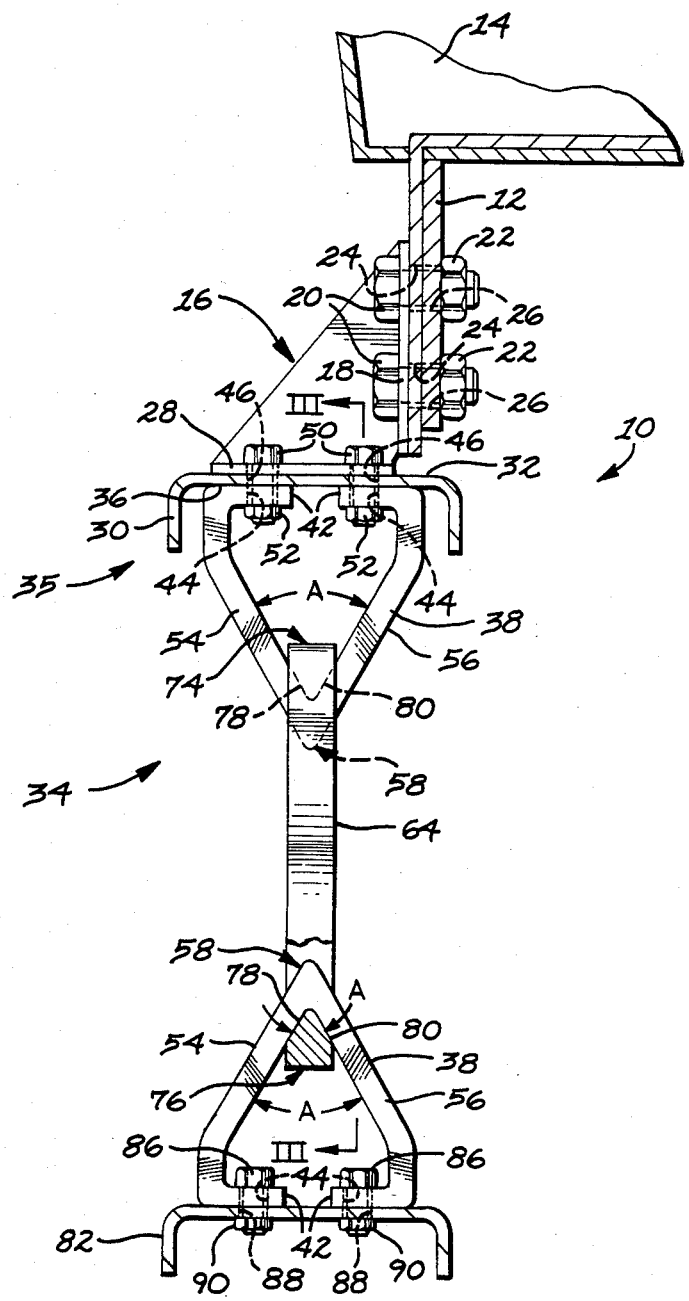
FIG. 2 is a fragmentary side view of the step assembly taken along lines II—II of FIG. 1.

A pair of step supporting bracket assemblies 16 are mounted to the frame 12 along a laterally extending face 18 of the bracket by a plurality of bolts 20 and nuts 22. The bolts 20 extend from one side of face 18 through a pair of aligned holes 24 and 26 which are positioned on face 18 and frame 12 respectively to be threadably received by nuts 22 to secure the bracket assemblies 16 to the frame 12 (FIG. 2). A horizontally extending flange 28 is formed on each bracket assembly 16 to which is mounted an upper step or foot supporting member 30. The step 30 has an upper surface 32 which engages the flanges 28 and is rigidly secured thereto in a manner to be described hereinafter.

Figure 3:
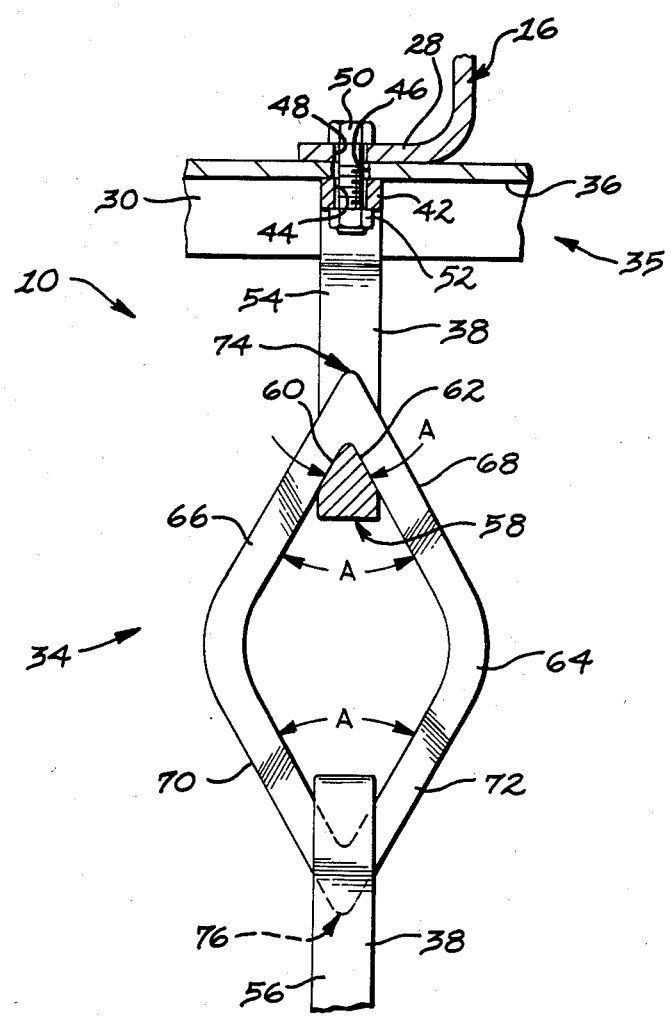
FIG. 3 is an enlarged sectional view of the link assemblies as indicated in FIG. 2.

A pair of identical chain assemblies 34 each have a first end 35 that is suspended from a lower surface 36 of step 30. The first ends 35 are laterally spaced from one another corresponding to the lateral spacing of brackets 16 and more particularly to the respective locations of the laterally extending flanges 28. Each chain assembly has a pair of upper and lower step mounting links 38 that are identical. As shown in FIG. 3, each link has a pair of base mounting legs 42 individually providing a hole 44 therethrough. The upper step mounting link 38 is positioned such that the legs 42 engage the underside 36 of step 30 with holes 44 in registry with a plurality of holes 46 in step 30 and holes 48 of the flange 28. A bolt 50 is positioned through the sets of aligned holes 44, 46 and 48, and a nut 52 is threadably received on one end to secure the step 30 and upper link 38 to flange 28 of the bracket assembly 16. Each step mounting link 38 has a pair of first and second link side portions 54 and 56 which are connected to the legs 42 and converge towards each other to merge at a junction 58 to form an internal or included angle "A" that is of a preselected size. Each link 38 also has a triangularly shaped cross section with a pair of the sides 60,62 of the triangle being inwardly directed and forming an angle corresponding to angle "A" (FIG. 3).

An intermediate link 64 interconnects upper and lower step supporting links 38. The link 64 which is best seen in FIGS. 1 and 3, is diamond shaped and formed of a plurality of side portions 66, 68, 70 and 72. Side portion 66 and 68 converge toward each other from a midsection of the link to a junction 74 to form an upper internal angle of a size corresponding to angle "A". Side portions 70 and 72 also converge toward each other from the mid-section of the link in a direction opposite that of the side portions 66 and 68, joining each other at a junction 76 to form another, lower internal angle, which also corresponds to angle "A". The link 64 also has a triangularly shaped cross section, which like step supporting links 38, has a pair of inwardly directed sides 78 and 80 that converge at an angle equal to angle "A" (FIG. 2).

A lower step 82 is positioned adjacent a second end 84 of the chain assemblies 34 and is secured to the leg portions 42 of the lower step mounting links 38 by a plurality of bolts 86 (FIG. 2). The bolts 86 are positioned within a plurality of holes 88 in the lower step 82 that are aligned with the holes 44 of the legs 42. A plurality of nuts 90 are threadably received on the bolts to securely mount step 82 to the lower links 38. Unlike the upper step 30, which is rigidly mounted to the frame 12 the lower step 82 being suspended from the frame by the chain assemblies 34, is movable relative to the frame 12.

The chain assemblies 34 gravitationally depend from the vehicle 14 so that the junctions 74 and 76 formed on the upper and lower ends of intermediate link 64 will be adjacent the junction 58 of step mounting links 38. The links are engaged in such a manner to place the angled portion formed by the cross section of the upper step mounting link 38 within the internal angle formed by the side portions 66 and 68 of the link 64 in a first plane which is best illustrated in FIGS. 1 and 3. Similarly, the angled portion formed by the cross section of the link 64 nests within the internal angle formed by the side portions 54 and 56 of upper step mounting link 38 in a second plane which is illustrated in FIG. 2. The same relationship exists between the lower portion of link 64 and the lower step mounting link 38.

The various angles formed by the cross sections of the links 38 and 64, and the internal angles formed by the converging side portions 54–56, 66–68, and 70–72 of the links 38 and 64 are all substantially equal to each other. In this particular embodiment, the angles are approximately 60°. The angles may vary with the type of material from which the links are made, and that material's particular coefficient of sliding friction. The coefficient of sliding friction is the ratio of the friction force resisting motion and the perpendicular force pressing the two surfaces together and is expressed as a formula:

$$\text{Coefficient of Friction} = \frac{\text{Force (required to cause members to slide)}}{\text{Weight (of object)}}$$

In this embodiment, the links are formed from cast iron and the coefficient of friction is equal to 0.15. However, the type of material and the magnitude of the preselected angle "A" may be altered to produce a greater or smaller coefficient of friction or resistance to relative movement between the links.

INDUSTRIAL APPLICABILITY

During operation of vehicle 14, it is often required that the machine run in very rugged terrain. As the vehicle is moved over uneven ground, it is not unusual for logs, rocks or the lay of the ground to come within close proximity of the frame 12 of vehicle 14. As this happens the step assembly 10 may be subjected to impact from any direction. The step assembly 10, however, is allowed to give upon impact because the links 38 and 64 of chain assemblies 34 are allowed to move relative to each other due to their loosely interlinking arrangement. Also, because it is a chain, it is made of very durable material that will withstand extremely large forces without failure.

When an operator approaches to gain entrance to the operator's station, initial placement of his foot upon the foot support member 82 imposes a downward force F upon the chain assembly. This causes an interaction between the angles "A" formed by the cross section of links 38 and 64 and the internal angles formed by the side portions of the links. Such interaction causes a wedging force to be applied to these angles in two different planes which locks the links together to provide a substantially rigid step support. Since the chain assemblies 34 become substantially rigid members, the step assembly 10 will resist any tendency to swing horizontally toward the machine under the weight of the operator, thereby avoiding any possible contact between the operator's leg and the frame 12 of vehicle 14.

Thus the flexible step assembly 10 as described above exhibits extreme flexibility and strength for a long service life when exposed to impact forces encountered in vehicle operation yet becomes substantially rigid in all directions upon application of an operator's weight to provide a stable platform from which he may enter or exit the machine.

Other aspects, objects and advantages of this invention can be obtained from a study of the drawings, the disclosure and the appended claims.

We claim:

1. In a flexible step assembly for a vehicle having a frame and a foot supporting member suspended from said frame by a pair of laterally spaced chain assemblies, the improvement comprising:

a first link in each of said chain assemblies having first and second side portions that converge toward one another to form a pre-selected angle and having a generally triangular cross-section with two sides of said triangle forming an angle corresponding to said pre-selected angle formed by said link side portions;

said first link being secured to said vehicle frame;

a second link in each of said chain assemblies having first and second side portions that converge toward one another to form an angle, and third and fourth side portions that converge toward one another to form an angle, said third and fourth side portions being connected to said first and second side portions at a mid-portion of said second link, said angles formed by said side portions of said second link corresponding to said pre-selected angle, said second link having a triangular cross-section with two sides of said triangle forming an angle corresponding to said pre-selected angle; and a third link in each of said chain assemblies having first and second side portions that converge toward one another to form an angle corresponding to said pre-selected angle and having a triangular cross-section with two sides of said triangle forming an angle corresponding to said pre-selected angle, and being connected to said foot supporting member, said third link being positioned with the first and second side portions thereof in interlocking engagement with the third and fourth side portions of the second link, and the first and second side portions of said second link being in interlocking engagement with the first and second side portions of the first link, the two sides of the respective triangular cross-sections of the respective links being in nesting engagement with the angles formed by the respective interlocking side portions of said links to provide a wedging force therebetween to render the chain assemblies substantially rigid when a downward force of a pre-selected magnitude is applied to said foot supporting member.

2. A flexible step assembly as set forth in claim 1 wherein a first and second flange member having apertures formed therein is connected to one of said respective first and second link side portions of said first link.

3. A flexible step assembly as set forth in claim 2 further comprising means for securing said first link to said frame, said securing means being positioned through said apertures in said first and second flange members of said first link and said apertures in said brackets.

4. A flexible step assembly as set forth in claim 4 wherein a first and second flange member having apertures formed therein is connected to one of said respective first and second side portions of said third link.

5. A flexible step assembly as set forth in claim 4 further comprising means for securing said third links to said foot supporting member, said securing means being positioned through said apertures in said first and second flange members of said third links and said apertures in said foot supporting member.

* * * * *

UNITED STATES PATENT AND TRADEMARK OFFICE
CERTIFICATE OF CORRECTION

PATENT NO. : 4,564,205

DATED : January 14, 1986

INVENTOR(S) : Dennis R. Shookman, et al

It is certified that error appears in the above-identified patent and that said Letters Patent are hereby corrected as shown below:

Column 6, claim 4, line 13, Change "4" to --1--.

Signed and Sealed this

First Day of July 1986

[SEAL]

Attest:

Attesting Officer

DONALD J. QUIGG

Commissioner of Patents and Trademarks